Dec. 1, 1953     H. G. COOPER     2,661,069
WHEEL DRIVING AND STEERING MECHANISM

Filed Jan. 10, 1951

Inventor
HENRY G. COOPER

UNITED STATES PATENT OFFICE 2,661,069

WHEEL DRIVING AND STEERING MECHANISM

Henry G. Cooper, United States Navy

Application January 10, 1951, Serial No. 205,397

4 Claims. (Cl. 180—13)

(Granted under Title 35, U. S. Code (1952), sec. 266)

This invention relates to a steering and driving mechanism for a powered wheel.

More specifically it is directed to a combination of steering and power mechanism so constructed near the powered wheel so that the height of the mechanism is lower than the diameter of the wheel used. The mechanism is relatively simple and is compact, the arrangement and ratio of driving and steering parts being such that a wheel steering ring and a wheel powering ring may rotate at equal angular velocities and in doing so will cause the powered wheel to rotate about a vertical axis.

The wheel steering ring will sometimes be referred to herein as the shaft supporting ring where this nomenclature is more representative of its function in the combination.

An object of this invention is to provide a compact low height unit for effecting steering of a powered wheel of automotive and other devices.

Another object is to provide a combination of concentric control rings and driving connections to reliably and simply drive and steer a wheel.

Another object is to provide a wheel steering shaft and a wheel power shaft which are interconnected by a system of gears and supporting shafts, said interconnection being constructed and arranged so that only a turning motion may be produced at the wheel when rotation of the steering shaft occurs.

Another object is to provide a steering mechanism and powered wheel combination in which equal angular velocities of two rings such as would result from locking the rings together or use of proper gear ratio will result in rotation of the powered wheel about a vertical axis.

Another object is to provide a steering mechanism for a powered wheel, said mechanism including a differential cooperating with gears on concentric shafts to control wheel powering and steering rings.

These and other objects will be manifest from a consideration of the following description, claims and drawings in which:

Figure 1:
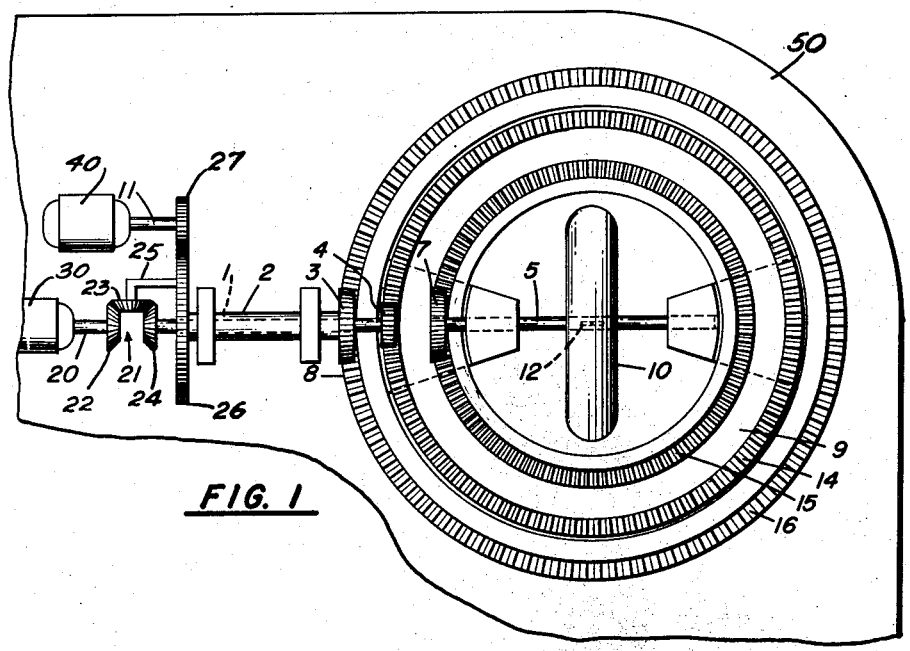
Fig. 1 is a schematic view of the steering drive and powered wheel combination.

Referring to Fig. 1, there is shown a differential 21, comprising bevel gears 22, 23, and 24. The gear 22 is fixedly coupled to the shaft 20, while the gear 24 is fixedly coupled to the shaft 1 which is free to rotate inside of tube shaft 2. The gear 23 is fixedly coupled to the right angle shaft 25 which is eccentrically mounted, as shown, on the gear 26, which is mounted concentrically of shaft 1 and fixed to tubular shaft 2. Bevel gear 3 is fixed to the end of shaft 2 and bevel gear 4 is similarly fixed on shaft 1 as shown. A third shaft 5 is mounted for free rotation in steering ring 8 and is fixed by key 12 to the wheel so as to rotate with the wheel. The shaft 5 is driven by gear 7.

Preferably wheel powering ring 9 is rotatably positioned as shown within the grooved portion of steering ring 8 and has two concentric circular rack gear portions 14 and 15 which intermesh with gears 4 and 7 respectively. The steering ring 8 has a similar circular rack gear portion 16 for meshing with gear 3 of shaft 2.

In operation, when straight line motion of the wheel 10 is desired, power is supplied from any convenient motive source 30 to the shaft 20, while the source 40 is maintained inoperative and the shaft 11 is stationary. The rotation of shaft 20 is transmitted to the shaft 1 and the gear 4 through the gears 22, 23 and 24 of the differential 21. Rotation of the gear 4, causes rotation of the wheel powering ring 9 within the steering ring 8 which remains stationary. It is noted that the rotation of the wheel powering ring 9 is transmitted from the ring gear 15 to the gear 7 and to the wheel 10, thereby causing forward (or rearward) motion of the wheel.

Figure 2:
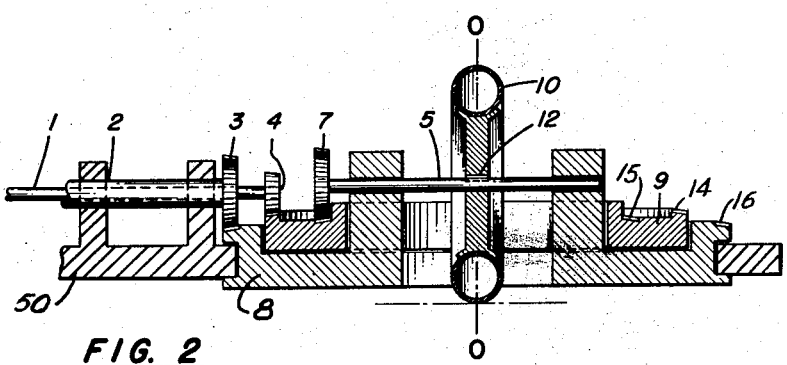
Fig. 2 is a detail view showing the steering ring and wheel powering ring in section and the driving gears for the powered wheel.

When it is desired to "steer," i. e., to obtain rotation of the wheel 10 around the axis 0—0, as seen in Fig. 2, the device may be operated in any one of several ways.

First, if the ratio of parts is properly designed rotation of the wheel 10 about its vertical axis will result from locking the steering ring 8 and wheel powering ring together and putting power into either shaft 1 or shaft 2 while the other shaft is idle. Thus if the rings are so locked, it is seen that rotation of shaft 20 will cause rotation of the shaft 1 and the gear 4, as explained above, and gear 4 will transmit motion to the ring 9 and it is seen that the entire structure will rotate and the wheel 10 will turn on its axis 0—0.

A second mode of operation to obtain rotation of the wheel 10 on its axis 0—0 is also available. Instead of locking rings 8 and 9 together the power shaft 20 may be assumed to be fixed. Then when steering shaft 11 is rotated by a power source represented schematically at 40 it operates through conventional differential 21 and causes shaft 1 to rotate at twice the speed of shaft 2 because of the relative size of gears 21, 26 and 27. Motion is transmitted from source 40 as follows: rotation is transmitted to the shaft 11 and the gear 27 which causes rotation of the gear 26. Since the gear 22 is restrained, and since the gear 23 is eccentrically mounted on the gear 26, gear 26 will rotate and revolve around the gear 22 and will cause rotation of the gear 24 and the shaft 1. It is understood, of course, that for operation in this manner, the ratio of bevel gear 3 to the ring gear 16 on steering ring 8 must, therefore, be twice the ratio of bevel gear 4 to the ring gear 14 on wheel powering ring 9 with which gear 4 meshes. Accordingly the angular speed of rings 8 and 9 will be equal and simple rotation of the wheel 10 about axis 8—8 will be accomplished under these conditions. Since, as shown, the ring gear 14 is smaller than the ring gear 16, it obviously follows that the bevel gear 4 must be designed so that it will be much smaller than the bevel gear 3. It is feasible, however, to arrange any combination of gearing throughout the entire system so long as equal angular velocities of the rings 8 and 9 will result when shaft 11 is rotated as shaft 20 is restrained.

It will be understood that in actual operation the rings will have different angular velocities during motion of the vehicle when rotation of the steering shaft 11 is being effected while the power shaft 20 is rotating.

The schematic drawing is used to better illustrate the novelty and for the same reason conventional structures such as bearings have been purposely omitted, and the showing of supporting members, housing and the like is schematic. For example, the platform 50 schematically represents the framework or housing upon which the various components of this novel device are supported in their proper relative positions.

The manner of rotating shafts 1 and 2 and the particular configuration of steering ring 8 and wheel powering ring 9 are merely illustrative and not limitative, it being desired to fully cover the inventive novelty of the concept by the appended claims.

The invention described herein may be manufactured and used by or for the Government of the United States of America for governmental purposes without the payment of any royalties thereon or therefor.

I claim:

1. In combination, a steering shaft, a powered wheel, a wheel supporting shaft, means for securing the wheel to the wheel supporting shaft, a rotatable supporting ring in which the wheel supporting shaft is mounted diametrically for free rotation, a wheel powering ring concentric with the rotatable supporting ring, and driving means connecting each of said rings to the steering shaft, said driving means including gears for rotating each of the concentric rings in the same direction at equal angular velocities when the steering shaft is rotated.

2. In combination, a steering shaft, a power shaft, an idler gear, a powered wheel, a supporting shaft to which the powered wheel is fixed, a rotatable wheel steering supporting ring in which the supporting shaft is diametrically mounted, a wheel powering ring concentric with the rotatable supporting ring, said wheel powering ring having two circular rack gears and said rotatable supporting ring having a circular rack gear, a gear on the supporting shaft meshing with one of said rack gears of the wheel powering ring, a first tubular shaft, a second shaft located concentrically within said first shaft, a gear at one end of each of the first and second shafts, respectively, for engagement with the circular rack gear on said supporting ring and the other of said rack gears of the wheel powering ring, respectively, one other gear on each of said first and second shafts, said power shaft and steering shaft each having a gear for driving the tubular and concentric shaft, the gear of the power shaft being operatively connected to said second concentric shaft by the idler gear and said other gear on the second shaft, and said idler gear being mounted for bodily rotation with said other gear on the tubular shaft which meshes with the gear on the said steering shaft.

3. The combination of claim 2 further defined in that the ratio of the several gears is such that rotation of the steering shaft while the power shaft is stationary will give equal angular rotation to the wheel powering ring and the rotatable supporting ring.

4. In combination, a steering shaft, a power shaft, a powered wheel, a supporting shaft to which the powered wheel is fixed, a rotatable supporting ring in which the wheel supporting shaft is diametrically mounted, a wheel powering ring concentric with the rotatable supporting ring, power transmitting means operatively connecting the power wheel ring and the wheel supporting shaft, driving means connecting the wheel powering ring to the power shaft, driving means connecting the rotatable supporting ring to the steering shaft, and means including a differential gearing interconnecting the drives for the rotatable supporting ring and the wheel powering ring, the said driving means including gears, the driving ratio of which is such that rotation of the steering shaft while the power shaft is stationary will give equal angular rotation of the power wheel ring and the rotatable supporting ring.

HENRY G. COOPER.

References Cited in the file of this patent

UNITED STATES PATENTS

| Number | Name | Date |
|---|---|---|
| 1,061,104 | Nett | May 6, 1913 |